United States Patent [19]

Yale et al.

[11] 3,856,782

[45] Dec. 24, 1974

[54] 2-BENZYL-3H,7H-QUINO(8,1-CD)(1,5)BENZOXAZEPIN-3-ONE

[75] Inventors: Harry Louis Yale, New Brunswick, N.J.; Ramesh B. Petigara, Lansdale, Pa.

[73] Assignee: E. R. Squibb & Sons, Inc., Princeton, N.J.

[22] Filed: May 23, 1973

[21] Appl. No.: 363,202

[52] U.S. Cl. ....... 260/240 F, 424/256, 260/283 SA, 260/286 R, 260/288 R
[51] Int. Cl. ............................................. C07d 39/00
[58] Field of Search ...... 260/240 F, 283 SA, 288 R, 260/286 R

[56] References Cited
UNITED STATES PATENTS
3,784,549   1/1974   Yale et al. ........................ 260/287 R
3,784,550   1/1974   Yale et al. ........................ 260/287 R

OTHER PUBLICATIONS

Petigara et al., J. of Heterocyclic Chemistry, Vol. 8, pages 455 to 463, (June 1971).

*Primary Examiner*—John D. Randolph
*Attorney, Agent, or Firm*—Lawrence S. Levinson; Merle J. Smith; Stephen B. Davis

[57] ABSTRACT

2-substituted-3H,7H-quino[8,1-cd][1,5]benzoxazepin-3-one compounds and their methods of preparation are described. In addition, pharmaceutical compositions containing said compounds and methods for using said compositions in the treatment of inflammation are taught.

14 Claims, No Drawings

2-BENZYL-3H,7H-QUINO(8.1-CD)(1,5) BENZOXAZEPIN-3-ONE

This invention relates to compounds of the formulae

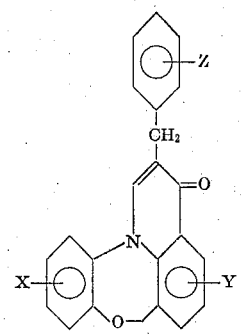

and

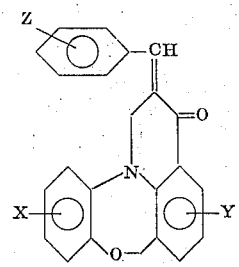

wherein Z is selected from the group consisting of hydrogen, halo, trifluoromethyl, lower alkyl, lower alkoxy, di(lower alkoxy), tri(lower alkoxy), (lower alkyl)$_2$amino and (lower alkyl)$_2$amino lower alkoxy and X and Y are selected from the group consisting of hydrogen, chloro, bromo, trifluoromethyl, (lower alkyl)$_2$sulfonamido, lower alkyl and lower alkoxy, with the proviso that at least one member of the group consisting of X and Y is hydrogen.

In addition this invention encompasses the methods for preparing said compounds, pharmaceutical compositions containing said compounds and methods for using said compositions in the treatment of inflammation.

The term "lower alkyl" is intended to mean a branched or straight chain hydrocarbon fragment having from one to eight carbon atoms.

The term "lower alkoxy" is intended to mean "lower alkyl-O—."

The term "halo" is intended to encompass fluoro, chloro and bromo.

The compounds of this invention of the formula:

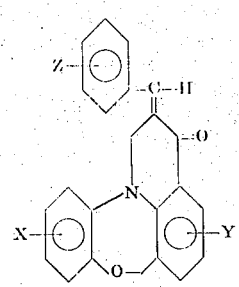

wherein X, Y and Z are as previously defined, are prepared by reacting the readily available compounds of the formula

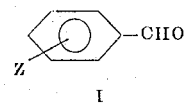

with a compound of the formula:

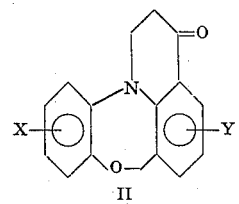

This reaction may be carried out in aromatic hydrocarbon solvents, such as benzene, toluene, and xylene, etc. or protic solvents, such as methanol, ethanol, isopropanol, etc., at a temperature range of from about 20° to about 135°, preferably approximately 80 for from 5 to 60 hours, preferably about 24 hours in the presence of a salt of an organic base or an organic acid or a strong acid, such as p-toluenesulfonic acid or hydrochloric acid. The preferred salts comprise an amine portion, such as piperidine, triethylamine, etc. and a carboxylic acid, such as benzoic acid, acetic acid, etc.; the preferred catalyst being piperidine benzoate.

The compounds of formula II are described in co-pending application Ser. No. 171,731, filed Aug. 12, 1971, now U.S. Pat. No. 3,784,550 which is incorporated by reference.

The compound of this invention of the formula:

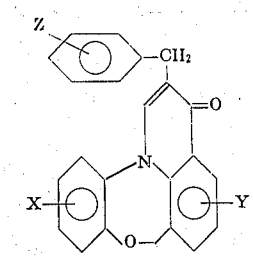

wherein X, Y and Z are as previously defined, are prepared by reacting a compound of the formula I with a compound of the formula II in a protic solvent, such as ethanol or isopropanol, at a temperature range of from about 60° to 110°, preferably about 80°, for from about 1 to about 10 hours, preferably about 3 hrs. in the presence of a strong base as catalyst. Typical of the strong bases that may be employed are sodium hydroxide, potassium hydroxide, sodium ethoxide, and trimethylbenzylammonium hydroxide.

A second method for the preparation of the above compounds utilizes an isomerization reaction wherein the compounds of the formula:

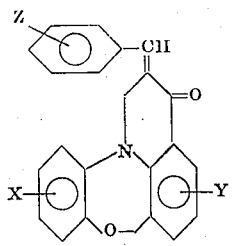

are heated at temperatures of about 60° to about 100°, preferably to about 80° for about 3 to 30 minutes, preferably about 5 minutes in a protic solvent, preferably ethanol in the presence of a strong base. While the preferred base is sodium hydroxide, bases such as potassium hydroxide, sodium ethoxide and trimethylbenzylammonium hydroxide may be used.

The preferred compounds of this invention are those wherein X and Y are hydrogen, chloro and trifluoromethyl, with the provisio that at all times one member of the group comprising X and Y is hydrogen, Z is di(-lower alkyl)amino-lower alkoxy and the most preferred being those wherein X is chloro or trifluoromethyl and Y is hydrogen and Z is di(ethylamino)ethoxy.

The compounds of this invention have thus been found to be highly useful as antiinflammatory agents in mammals when administered in amounts ranging from about 1 mg. to about 10 mg. per kg. of body weight per day. A preferred dosage regimen for optimum results would be from about 2 mg. to about 5 mg. per kg. of body weight per day, and such dosage units are employed that a total of from about 70 mg. to about 700 mg of active ingredient for a subject of about 70 kg. body weight are administered in a 24 hour period.

The compounds of the present invention in the described dosages are intended to be administered orally; however, other routes such as rectally, intraperitoneally, subcutaneously, intramuscularly or intravenously may be employed.

The active compounds of the present invention are orally administered, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chewing gum, and the like. Such compositions and preparations should contain at least 0.1% of active compound. The percentage in the compositions and preparations may, of course, be varied and may conveniently be between about 5% to about 75% or more of the weight of the unit. The amount of active compound in such therapeutically useful compositions or preparations is such that a suitable dosage will be obtained. Preferred compositions or preparations according to the present invention are prepared so that an oral dosage unit form contains between about 10 and 200 milligrams of active compound.

The tablets, troches, pills, capsules and the like may also contain the following: a binder such as gum tragacanth, acacia, corn starch or gelatin; an excipient such as dicalcium phosphate a disintegrating agent such as corn starch, potato starch, alginic acid and the like; a lubricant such as magnesium stearate; and a sweetening agent such as sucrose, lactose, or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

DETAILED DESCRIPTION

The following examples are provided for illustrative purposes and may include particular features of the invention; however, the examples should not be construed as limiting the invention, many variations of which are possible without departing from the spirit or scope thereof.

EXAMPLE 1

1,2-Dihydro-11-(trifluoromethyl)-3H,7H-quino[8,1-c,d]-[1,5]benzoxazepin-3-one

A. 5,11-Dihydro-7-(trifluoromethyl)dibenz[b,e][1,4]oxazepine-5-propionic acid

To 50.0 g of 5,11-dihydro-7-(trifluoromethyl)dibenz-[b,e][1,4]oxazepine in 60 ml of redistilled acrylonitrile is added in 5 minutes 0.80 ml of Triton B. Subsequently, the mixture is heated for one hour under reflux and the product isolated by extraction with benzene to give 5,11-dihydro-7-(trifluoromethyl)dibenz[b,e][1,4]oxazepine-5-propionitrile, m.p. about 161°–163°.

7-(Trifluoromethyl)-5,11-dihydrodibenz[b,e][1,4]oxazepine-5-proprionitrile, 15.0 g, is dissolved in 240 ml of dry dioxane and to this 140 ml of 30% methanolic hydrogen chloride is added. The solution is stirred for 36 hours; 6 ml of $H_2O$ is added, stirred 0.5 hour, and then concentrated in vacuo to 120 ml. The solid is filtered, and the filtrate is concentrated to dryness in vacuo. The residual liquid is taken up in 200 ml of diethyl ether, treated with Darco and Hyflo, the diethyl ether solution concentrated and the residue distilled in vacuo to give 5,11-dihydro-7-(trifluoromethyl)dibenz[b,e][1,4]oxazepine-5-propionic acid, methyl ester, b. p. about 166°–168° (0.08 mm.), m.p. about 70.0°–71.5°. 7-(Trifluoromethyl)-5,11-dihydrodibenz[b,e][1,4]oxazepine-5-propionic acid, methyl ester, 3.15 g, is dissolved in 315 ml of methanol and to this 0.5 g of potassium hydroxide dissolved in 25 ml of water is added. The mixture is refluxed for 2.5 hours and then concentrated in vacuo. The residue is taken up in 250 ml of water and this solution is acidified with 2% aqueous HCl to give 5,11-dihydro-7-(trifluoromethyl)-dibenz[b,e][1,4]oxazepine-5-propionic acid, m.p. about 94°-96°; this is recrystallized from 300 ml of hexane to give about 2.7 g of the product, m.p. about 105°-107°.

B. 1,2-Dihydro-11-(trifluoromethyl)-3H,7H-quino[8,1-c,d]-[1,5]benzoxazepin-3-one A solution of 6.86 g of 5,11-dihydro-7-(trifluoromethyl)dibenz[b,e][1,4]oxazepine-5-propionic acid in 50 ml of benzene is cooled to 5°-10°. To this is added dropwise with stirring a solution of 4.6 g of $PCl_5$ in 25 ml of benzene over a period of 15 minutes. The solution is stirred at 25° for 40 minutes and then at 40°-50° for another 20 minutes. The reaction mixture is then heated at 55° for 10 minutes, cooled to 10° and to this is added dropwise with stirring a solution of 12.0g anhydrous stannic chloride in 20 ml of benzene. After stirring 20 minutes at 10° and 20 minutes at room temperature, 100 ml of ether are added, followed by 10 ml of concentrated hydrochloric acid, and then 100 ml of water. After stirring vigorously for 10 minutes, the organic phase is separated, and the aqueous phase is extracted with 100 ml of ether. The combined organic extracts are washed, dried, filtered and concentrated to dryness to give 6.9 of residue; this is crystallized from 2-propanol to give about 4.3 g of product, m.p. about 140°-142°.

EXAMPLES 2-4

According to the method of example 1, upon substituting in place of 5,11-dihydro-7-(trifluoromethyl)-dibenz[b,e][1,4]oxazepine, one of the following compounds:

5,11-dihydrodibenz[b,e][1,4]oxazepine,
5,11-dihydro-7-chlorodibenz[b,e][1,4]oxazepine, and
5,11-dihydro-6-methoxydibenz[b,e][1,4]oxazepine one obtains:

1,2-dihydro-3H,7H-quino[8,1-c,d][1,5]benzoxazepin-3-one,
11-chloro-1,2-dihydro-3H,7H-quino[8,1-c,d][1,5]-benzoxazepine-3-one and
1,2-dihydro-10-methoxy-3H,7H-quino[8,1-c,d][1,5]-benzoxazepine-3-one, respectively.

EXAMPLE 5

1,2-Dihydro-11-(trifluoromethyl)-2-trans-(3,4,5-trimethoxybenzylidene)-3H,7H-quino[8,1-cd][1,5]benzoxazepin-3-one.

To a solution of 2.4 g of the compound prepared in example 1 and 1.5 g of 3,4,5-trimethoxybenzaldehyde in 50 ml of anhydrous $C_6H_6$, there is added 7 drops of piperidine and 0.07 g of benzoic acid, and the mixture is heated for 20 hr, under reflux with simultaneous removal of $H_2O$ using a Dean-Stark water separator. The solvent is removed in vacuo to give about 3.9 g of a deep yellow orange solid residue. This is recrystallized from 400 ml of isopropanol to give about 2.3 g of the deep yellow crystalline product, mp about 209°-211° (sintering at 206°).

EXAMPLE 6 trans-2-[p-[2-(Diethylamino)ethoxy]benzylidene]-1,2-dihydro 11-(trifluoromethyl)-3H,7H-quino[8,1-cd][1,5]benzoxazepin-3-one.

A mixture of 3.2 g of the compound prepared in example 1, 2.2 g of p-(β-diethylaminoethoxy)benzaldehyde, 0.5 ml of piperidine and 0.11 g of benzoic acid in 110 ml of absolute ethanol is heated under reflux for 13 hrs. The orange colored reaction mixture is concentrated to dryness to give a viscous residue that solidifies when triturated with 20 ml of petroleum ether. This is recrystallized from 200 ml of hexane to give about 2.8 g of the deep yellow orange crystalline product, mp about 110°-112°.

EXAMPLE 7 trans-1,2-Dihydro-2-(m-nitrobenzylidene)-11-(trifluoromethyl)-3H,7H-quino[8,1-cd][1,5]benzoxazepin-3-one.

A mixture of 2.3 g of the compound prepared in example 1, 1.1 g of m-nitrobenzaldehyde and 0.1 g of p-toluenesulphonic acid in 60 ml of anhydrous benzene is heated under reflux, using Dean-Stark water separator, for 5 hrs. The orange-red reaction mixture is concentrated, and the residue is triturated with 100 ml of petroleum ether to give a deep yellow orange solid. This is recrystallized from 300 ml of isopropanol to give about 2.1 g of the product, mp about 183°-186°.

EXAMPLE 8

2-trans-Benzylidene-1,2-dihydro-11-(trifluoromethyl)-3H,7H-quino[8,1-cd][1,5]benzoxazepin-3-one.

A. To a mixture of 3.2 g of the compound prepared in example 1 and 1.1 g of freshly distilled benzaldehyde in 35 ml of $CH_3COOH$, there is added 2.1 g of concd sulfuric acid. The resulting dark red mixture is stirred at room temp for 48 hrs, the solvent is removed in vacuo, and the brown colored residue is triturated with 200 ml of water, the suspension is cooled and neutralized with 5% aq. $NaHCO_3$. The mixture is filtered and the solid dried to give about 3.0 g of yellow brown material, mp 95°-140°. The ir spectrum shows the presence of exo and endo-$\alpha,\beta$-unsaturated ketones. The solid is dissolved in 50 ml of hot $CH_3COOH$, the orange colored solution is treated with 2.0 g of Darco, and filtered. The filtrate is concentrated to 15 ml and kept overnight at room temp. Deep yellow orange colored crystalline product is filtered and dried to give about 0.43 g of the named product, mp about 188°-190°.

B. A mixture of 3.2 g of the compound prepared in example 1, 1.3 g of benzaldehyde and 6 ml of 10% aqueous hydrochloric acid in 100 ml of isopropanol is heated under reflux for 18 hours. The reaction mixture is cooled and additional 35 ml of 10% aqueous hydrochloric acid and 1.0 g of benzaldehyde are added, and the reflux is continued for about 42 hours and cooled. The solid is filtered and recrystallized from isopropanol to give about 2.2 g of the name product, mp about 188°-189°.

EXAMPLES 9-11

According to the method of example 8(B), upon substituting in place of the compound of example 1, the compounds of examples 2 to 4, one obtains:

2-trans-benzylidene-1,2-dihydro-3H,7H-quino[8,1-cd][1,5]benzoxazepin-3-one.
2-trans-benzylidene-11-chloro-1,2-dihydro-3H,7H-quino[8,1-cd][1,5]benzoxazepin-3-one and
2-trans-benzylidene-1,2-dihydro-10-methoxy-3H,7H-quino[8,1-cd][1,5]benzoxazepin-3-one, respectively.

EXAMPLE 12

11-(Trifluoromethyl)-2-(3,4,5-trimethoxybenzyl)-3H,7H-quino[8,1-cd][1,5]benzoxazepin-3-one.

To a solution of 0.6 g of the compound prepared in example 5, in 50 ml of ethanol, there is added 0.2 g of powdered NaOH, and the deep yellow solution is heated to reflux on the steam bath. The color of the reaction mixture fades to very pale yellow. The reflux is maintained for 5 minutes, and the solvent is removed in vacuo to give an off-white semisolid, which solidifies when triturated with 100 ml of water. The solid is filtered, washed with water, dried in vacuo at 75° to give about 0.52 g of the product, mp 142°–145°. This is recrystallized from 70 ml of diisopropyl ether to give about 360 mg of the colorless crystalline product, mp about 143°–145°.

EXAMPLE 13

2-[p-[2-(Diethylamino)-ethoxy]benzyl]-11-(trifluoromethyl)-3H,7H-quino[8,1-cd][1,5]benzoxazepin-3-one.

A mixture of 4.8 g of the compound prepared in example 1, 3.4 g of 4-[β-(diethylamino)ethoxy]benzaldehyde, 1.2 g (0.03 mol) of powdered NaOH in 75 ml of absolute ethanol is heated at 55° for 1 hour and at 75° for 1 hour while stirring. The solvent is removed, the residue is suspended in 400 ml of ether and washed with three 100 ml portions of N aq. HCl. The acid extract is cooled, an excess of 50% aqueous NaOH added and the base is extracted with three 100 ml portions of $CHCl_3$. The $CHCl_3$ solution is washed, dried, and concentrated in vacuo to give about 6.6 g of an orange colored viscous liquid that solidifies to give about 5.6 g of a pink colored solid, mp 130°–150° when triturated with 20 ml of petroleum ether. The solid is recrystallized from 100 ml of boiling isopropanol to give about 2.7 g of the titled product, mp about 157°–159°.

Similarly, by substituting an equivalent amount of the compounds of examples 2 and 3 for the compounds of example 1, one obtains 2-[p-[2-diethylamino)ethoxy]benzyl]-3H,7H-quino[8,1-cd]-[1,5]benzoxazepin-3-one respectively.

EXAMPLE 14

2-[p-(Dimethylamino)benzyl]-11-(trifluoromethyl)-3H,7H-quino[8,1-cd][1,5]benzoxazepin-3-one.

A mixture of 3.2 g of the compound prepared in example 1, 1.5 g of p-dimethylaminobenzaldehyde, and 1.0 g of NaOH in 70 ml of absolute ethanol is heated to reflux in about 1 hr. while stirring. The mixture turns to orange in color and a yellow colored solid separates. The reflux is maintained for 1.5 hr., the solid does not dissolve. The mixture is cooled and filtered. The solid is washed with about 200 ml of water, and dried to give about 4.1 g of a pale yellow product, mp 195°–199°. This is recrystallized from 220 ml of absolute ethanol to give about 2.6 g of a pale yellow colored product, mp about 198°–200°.

EXAMPLE 15

2-(p-Chlorobenzyl)-11-(trifluoromethyl)-3H,7H-quino[8,1-cd][1,5]benzoxazepin-3-one.

According to the procedure of example 14 and using 3.2 g of the compound prepared in example 1, 1.41 g of p-chlorobenzaldehyde, 0.8 g of NaOH and 100 ml of absolute ethanol there is obtained about 4.0 g of a pale yellow shiny product, mp about 227°–230°. This is recrystallizated from 550 ml of absolute ethanol to give about 2.9 g of the pure product, mp about 228°–230°.

EXAMPLE 16

Example 16

Preparation of Tablet Formulation

| Ingredient | Per Tablet (g.) | For 10,000 Tablets (g.) |
| --- | --- | --- |
| 2-[p-[2-(Diethylamino)ethoxy]-benzyl]-11-(trifluoromethyl)-3H,7H-quino[8,1-cd][1,5]-benzoxazepin-3-one | 0.1000 | 1000 |
| Lactose | 0.0800 | 800 |
| Corn Starch (for mix) | 0.0150 | 150 |
| Corn Starch (for paste) | 0.0100 | 100 |
|  | 0.2050 | 2,050 |
| Magnesium Stearate (1%) | 0.0013 | 12.5 |
|  | 0.2063 | 2,062.5 |

The active ingredient, lactose and corn starch (for mix) are blended together. The corn starch (for paste) is suspended in 800 milliliters of water and heated with stirring, to form a paste. This paste is then used to granulate the mixed powders. Additional water is used, if necessary. The wet granules are passed through a NO. 8 hand screen and dried at 120°F. The dry granules are then passed through a No. 16 screen. The mixture is lubricated with 1% magnesium stearate and compressed into tablets in a suitable tableting machine.

EXAMPLE 17

The sorbitol solution is added to 40 milliliters of distilled water and the active ingredient is suspended therein. The saccharin, sodium benzoate, flavor and dye are added and dissolved in the above solution. The volume is adjusted to 100 milliliters with distilled water.

Other ingredients may replace those listed in the above formulation. For example, a suspending agent such as bentonite magma, tragacanth, carboxymethylcellulose, or methylcellulose may be used. Phosphates, citrates or tartrates may be added as buffers. Preservatives may include the parabens, sorbic acid and the like and other flavors and dyes may be used in place of those listed above.

What is claimed is:

1. A compound of the formula

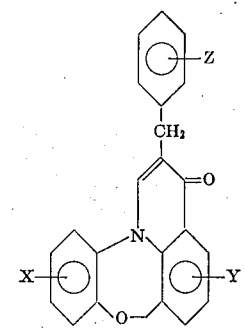

wherein Z is selected from the group consisting of hydrogen, halo, trifluoromethyl, lower alkyl, lower alkoxy, di(lower alkoxy), tri(lower alkoxy), (lower alkyl)$_2$amino and (lower alkyl)$_2$amino lower alkoxy and X and Y are selected from the group consisting of hydrogen, chloro, bromo, trifluoromethyl, (lower alkyl)$_2$sulfonamido, lower alkyl and lower alkoxy, with the provisio that at least one member selected from the group consisting of X and Y is hydrogen.

2. The compound of claim 1 wherein Z is di(lower alkyl)amino-lower alkoxy and X and Y are selected from the group consisting of hydrogen, chloro and trifluoromethyl.

3. The compound of claim 2 wherein Z is di(ethyl)-aminoethoxy and X is chloro or trifluoromethyl and Y is hydrogen.

4. The compound of claim 3 having the name 2-[p-[2-(diethylamino)ethoxy]benzyl]-11-(trifluoromethyl)-3H,7H-quino[8,1-cd][1,5]benzoxazepin-3-one.

5. The compound of claim 3 having the name 2-[p-[2-(diethylamino)ethoxy]benzyl]-11-(chloro)-3H,7H-quino[8,1-cd][1,5]benzoxazepin-3-one.

6. The compound of claim 2 having the name 2-[p-[2-(diethylamino)ethoxy]benzyl]-3H,7H-quino[8,1-cd][1,5]benzoxazepin-3-one.

7. The compound of claim 1 having the name 11-(trifluoromethyl)-2-(3,4,5-trimethoxybenzyl)-3H,7H-quino[8,1-cd]-[1,5]benzoxazepin-3-one.

8. The compound of claim 1 having the name 2-[p-(dimethylamino)benzyl]-11-(trifluoromethyl)-3H,7H-qunio[8,1-cd]-[1,5]benzoxazepin-3-one.

9. The compound of claim 1 having the name 2-(p-chlorobenzyl)-11-(trifluoromethyl(-3H,7H-quino[8,1-cd][1,5]benzoxazepin-3-one.

10. A compound of the formula:

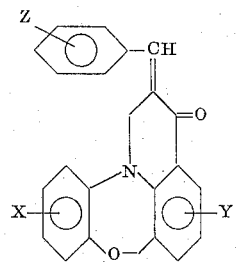

wherein Z is selected from the group consisting of hydrogen, halo, trifluoromethyl, lower alkyl, lower alkoxy, di(lower alkoxy), tri(lower alkoxy), (lower alkyl)$_2$amino and (lower alkyl)$_2$amino-lower alkoxy and X and Y are selected from the group consisting of hydrogen, chloro, bromo, trifluoromethyl, (lower alkyl)$_2$sulfonamido, lower alkyl and lower alkoxy, with the provisio that at least one member selected from the group consisting of X and Y is hydrogen.

11. The compound of claim 10 wherein Z is di(lower alkyl)amino-lower alkoxy and X and Y are selected from the group consisting of hydrogen, chloro and trifluoromethyl.

12. A process for the preparation of a compound of claim 10 which comprises reacting a compound of the formula:

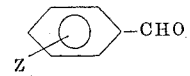

with a compound of the formula

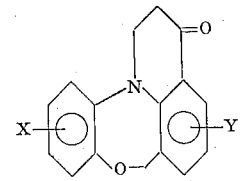

wherein Z, X and Y are as defined in claim 10, at a temperature of from about 20° to about 135°C for from about 5 to about 60 hours in the presence of piperidine benzoate or an acid selected from the group consisting of p-toluenesulfonic acid and hydrochloric acid and a solvent selected from the group consisting of benzene, toluene, xylene and lower alkanol.

13. A process for the preparation of a compound of claim 1 which comprises reacting a compound of the formula:

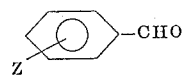

with a compound of the formula

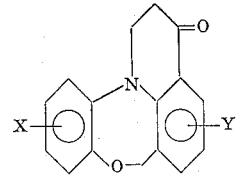

wherein Z, X, and Y are as defined in claim 1, at a temperature of from about 60° to about 110°C for from about 1 to about 10 hours in the presence of a strong base selected from the group consisting of sodium hydroxide, potassium hydroxide, sodium ethoxide and trimethylbenzylammonium hydroxide in a lower alkanol solvent.

14. A process for the preparation of a compound of claim 1 which comprises reacting a compound of claim 10 at a temperature of from about 60° to about 100°C for from about 3 to about 30 minutes with a strong base selected from the group consisting of sodium hydroxide, potassium hydroxide, sodium ethoxide and trimethylbenzylammonium hydroxide in the presence of a lower alkanol solvent.

* * * * *

UNITED STATES PATENT OFFICE
CERTIFICATE OF CORRECTION

Patent No. 3,856,782      Dated Dec. 24, 1974

Inventor(s) H. L. Yale and R. B. Petigara

It is certified that error appears in the above-identified patent and that said Letters Patent are hereby corrected as shown below:

The title should read as follows: --2-Benzyl-3H,7H-Quino-(8,1-cd)(1,5)Benzoxazepin-3-One Compounds--.

Col. 2, line 29, "80" should read --80°--.

Col. 6, after line 45 and before paragraph B, --Alternatively:-- should be inserted at the margin.

Col. 7, line 43 (last line of example 13), "respectively." should be deleted and the following should be inserted: --and 2-[p-[2-(diethylamino)ethoxy]benzyl]-11-chloro-3H,7H-quino[8,1-cd][1,5]benzoxazepin-3-one respectively.--

Col. 8, line 36, the following table should be inserted:

Preparation of oral syrup formulation

| Ingredient | Amount |
|---|---|
| 2-[p-[2-(Diethylamino)ethoxy]-benzyl]-11-(trifluoromethyl)-3H,7H-quino[8,1-cd][1,5]-benzoxazepin-3-one | 1000 mg. |
| Sorbitol solution (70% N.F.) | 40 ml. |
| Sodium benzoate | 150 mg. |
| Saccharin | 15 mg. |
| Red Dye (F.D. & C. No. 2) | 10 mg. |
| Cherry flavor | 50 mg. |
| Distilled water qs to | 100 ml. |

Col. 9, line 32, "qunio" should read --quino--.

Signed and sealed this 20th day of May 1975.

(SEAL)
Attest:

RUTH C. MASON
Attesting Officer

C. MARSHALL DANN
Commissioner of Patents
and Trademarks